(12) United States Patent
Fujii (10) Patent No.: US 9,729,800 B2
(45) Date of Patent: Aug. 8, 2017

(54) IMAGE GENERATION SYSTEM (71) Applicant: OLYMPUS CORPORATION, Shibuya-ku, Tokyo (JP)

(72) Inventor: Shintaro Fujii, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 336 days.

(21) Appl. No.: 14/552,138

(22) Filed: Nov. 24, 2014

(65) Prior Publication Data

US 2015/0181094 A1 Jun. 25, 2015

(30) Foreign Application Priority Data

Dec. 19, 2013 (JP) .................................. 2013-262950

(51) Int. Cl.
*H04N 5/238* (2006.01)
*G02B 21/00* (2006.01)
*G02B 21/36* (2006.01)

(52) U.S. Cl.
CPC ........... *H04N 5/238* (2013.01); *G02B 21/008* (2013.01); *G02B 21/0032* (2013.01);
(Continued)

(58) Field of Classification Search
CPC ................ H04N 5/238; G02B 21/0032; G02B 21/0076; G02B 21/008; G02B 21/0092;
(Continued)

(56) References Cited

U.S. PATENT DOCUMENTS 4,927,254 A 5/1990 Kino et al.
8,780,192 B2 7/2014 Hayashi
(Continued)

FOREIGN PATENT DOCUMENTS

CN 102735617 A 10/2012
EP 1933186 A1 6/2008
(Continued)

OTHER PUBLICATIONS

Extended European Search Report dated Jun. 2, 2015, issued in counterpart European Application No. 14194529.5.
(Continued)

*Primary Examiner* — Thai Tran
*Assistant Examiner* — Christopher T Braniff
(74) *Attorney, Agent, or Firm* — Holtz, Holtz & Volek PC (57) ABSTRACT

An image generation system includes a light detector configured to detect light from a sample; a super-resolution image component transmitter including an objective, configured to transmit the light from the sample including a super-resolution image component that exceeds a cut-off frequency of the objective to the light detector; and an image processor configured to enhance the super-resolution image component of an image of the sample in accordance with an output signal from the light detector. The super-resolution image component transmitter includes a light polarization converter that is placed in an optical path of illumination light for illuminating the sample and that is configured to convert a polarization state of the illumination light to make a polarization direction distribution in the light flux of the illumination light symmetric with respect to an optical axis of the illumination light.

20 Claims, 8 Drawing Sheets

(52) U.S. Cl.
CPC ..... *G02B 21/0076* (2013.01); *G02B 21/0092* (2013.01); *G02B 21/361* (2013.01); *G02B 21/365* (2013.01); *G02B 21/0044* (2013.01); *G02B 2207/114* (2013.01)

(58) Field of Classification Search
CPC  G02B 21/361; G02B 21/365; G02B 21/0044; G02B 2207/114
See application file for complete search history.

(56) References Cited

U.S. PATENT DOCUMENTS

| | | | |
|---|---|---|---|
| 8,817,088 | B2 | 8/2014 | Hayashi |
| 2009/0122397 | A1* | 5/2009 | Kubo ................. G02B 21/0032 359/386 |
| 2009/0296205 | A1* | 12/2009 | Ouchi ................... G02B 21/16 359/370 |
| 2012/0081535 | A1 | 4/2012 | Hayashi |
| 2013/0015366 | A1 | 1/2013 | Hayashi |
| 2013/0342768 | A1 | 12/2013 | Yokoyama et al. |
| 2014/0036057 | A1 | 2/2014 | Hayashi et al. |
| 2014/0321772 | A1* | 10/2014 | Piche ................... G02B 21/002 382/284 |
| 2014/0374575 | A1* | 12/2014 | Takesue ................... G01J 1/44 250/208.5 |

FOREIGN PATENT DOCUMENTS

| | | |
|---|---|---|
| EP | 2060946 A2 | 5/2009 |
| EP | 2437095 A2 | 4/2012 |
| JP | 2009258192 A | 11/2009 |
| JP | 2011022327 A | 2/2011 |
| JP | 2011028208 A | 2/2011 |
| JP | 2012047836 A | 3/2012 |
| JP | 2012078408 A | 4/2012 |
| JP | 2013020083 A | 1/2013 |
| WO | 2007043382 A1 | 4/2007 |
| WO | 2012124634 A1 | 9/2012 |
| WO | 2013067643 A1 | 5/2013 |

OTHER PUBLICATIONS

Sheppard, et al., "Annular Pupils, Radial Polarization, and Super-resolution", Applied Optics, vol. 43, No. 22, Jan. 1, 2004, pp. 4322-4770.

Japanese Office Action (and English translation thereof) dated Jun. 6, 2017 issued in counterpart Japanese Application No. 2013-262950.

* cited by examiner

IMAGE GENERATION SYSTEM

CROSS REFERENCE TO RELATED APPLICATIONS

This application is based upon and claims the benefit of priority from prior Japanese Patent Application No. 2013-262950, filed Dec. 19, 2013, the entire contents of which are incorporated herein by this reference.

BACKGROUND OF THE INVENTION

Field of the Invention

This invention is related to an image generation system, and particularly is related to an image generation system for generating a sample image with a resolution which surpasses the resolution limit of an optical system.

Description of the Related Art

A technology in which illumination light is spatially modulated and such modulated light is irradiated to a sample, so that a sample image has a resolution that surpasses the resolution limit of an optical system (hereinafter referred to as the "super-resolution image"), has recently been developed and put to practical use. This super-resolution image technology is disclosed in International Publication Pamphlet No. WO 2007/043382, for example.

Further, it is also well known that a technology generates the super-resolution image by carrying out a filtering process for a digital image of a sample including a super-resolution image component to enhance the super-resolution image component, so that the super-resolution image component can be clearly visualized. Such a technology is disclosed in Japanese Unexamined Patent Publication No. 2012-078408 and Japanese Unexamined Patent Publication No. 2013-020083.

SUMMARY OF THE INVENTION

One aspect of the present invention is to provide an image generation system with a light detector configured to detect light from a sample, a super-resolution image component transmitter including an objective and configured to transmit the light from the sample including a super-resolution image component to the light detector, wherein the super-resolution image component is a frequency component exceeding a cut-off frequency of the objective, and an image processor configured to enhance the super-resolution image component of an image of the sample generated in accordance with an output signal of the light detector, and the super-resolution image component transmitter includes a light polarization converter that is placed at an optical path of the illumination light irradiated to the sample and that converts a polarization state of the illumination light to make a polarization direction distribution in a light flux of the illumination light symmetrical with respect to the optical axis of the illumination light.

BRIEF DESCRIPTION OF THE DRAWINGS

The present disclosure will be more apparent from the following detailed descriptions when the accompanying drawings are referenced.

DESCRIPTION OF THE EMBODIMENTS

Figure 1:
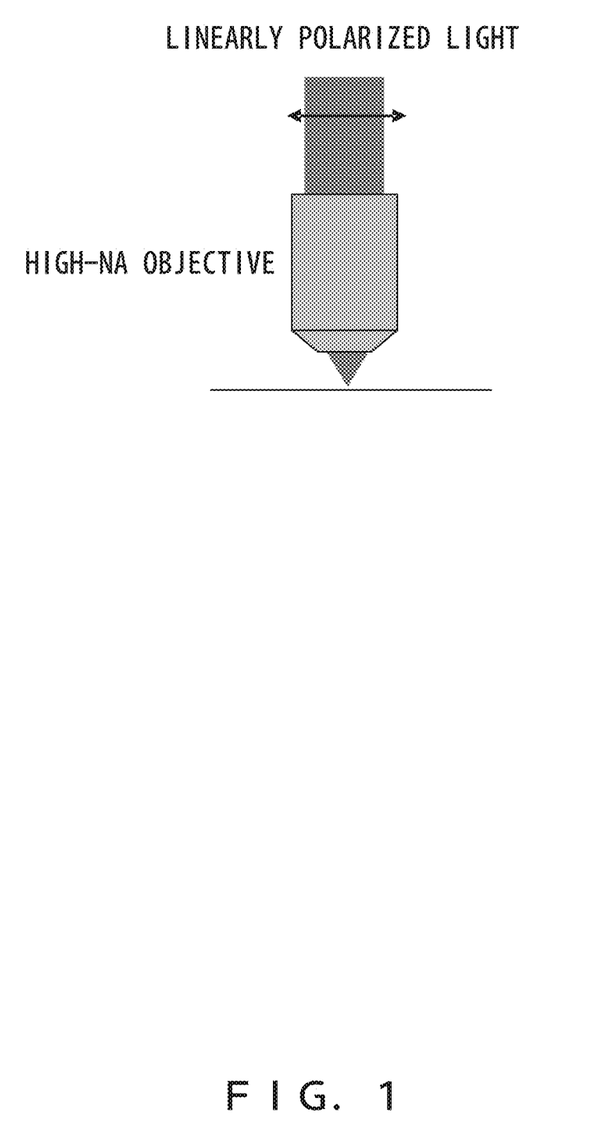
FIG. 1 is a diagram illustrating a state in which linearly polarized illumination light is condensed through a high-NA objective.
Figure 2:
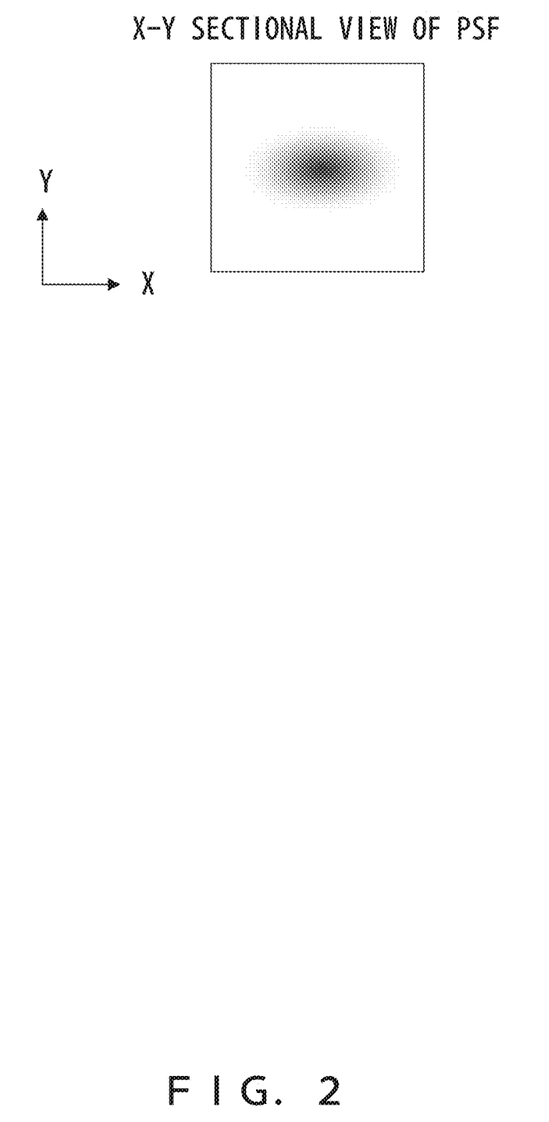
FIG. 2 illustrates a PSF of an optical system calculated under the condition illustrated in FIG. 1.

A spot shape of the illumination light formed on the sample changes with a polarization condition of the illumination light. For example, as illustrated in FIG. 1, when linearly polarized illumination light is condensed through a high-NA (Numerical Aperture) objective, since an illumination light distribution in the polarization direction is not symmetrical with respect to the optical axis of the illumination light, an illumination light spot formed on the sample is elliptical in shape and is asymmetrical with respect to the optical axis. In this case, as illustrated in FIG. 2, since a point spread function (PSF) of the optical system is also elliptical in shape and asymmetrical with respect to the optical axis, a resolution capability in X-direction of the optical system is different from a resolution capability in Y-direction of the optical system.

If the resolution capability of the optical system is different between the X-direction and the Y-direction, a resolution (also referred to as the resolution capability) of an image generated by an apparatus provided with its optical system is different between the X-direction and the Y-direction. Such a different resolution is not desirable. Since the directional dependence on the resolution capability in a conventional apparatus is, however, very slight and thus the directional dependence on the resolution of the image is limited, its influence has not usually been significant.

However, as disclosed in Japanese Unexamined Patent Publication No. 2012-078408 and Japanese Unexamined Patent Publication No. 2013-020083, for example, if an image including a super-resolution image component is generated and enhanced by a filtering process, the directional dependence on resolution capability is also enhanced, thereby influencing the image. In this case, it is possible for the directional dependence to become evident.

Hereafter, explanations are given for embodiments of the present invention.

First Embodiment

Figure 3:
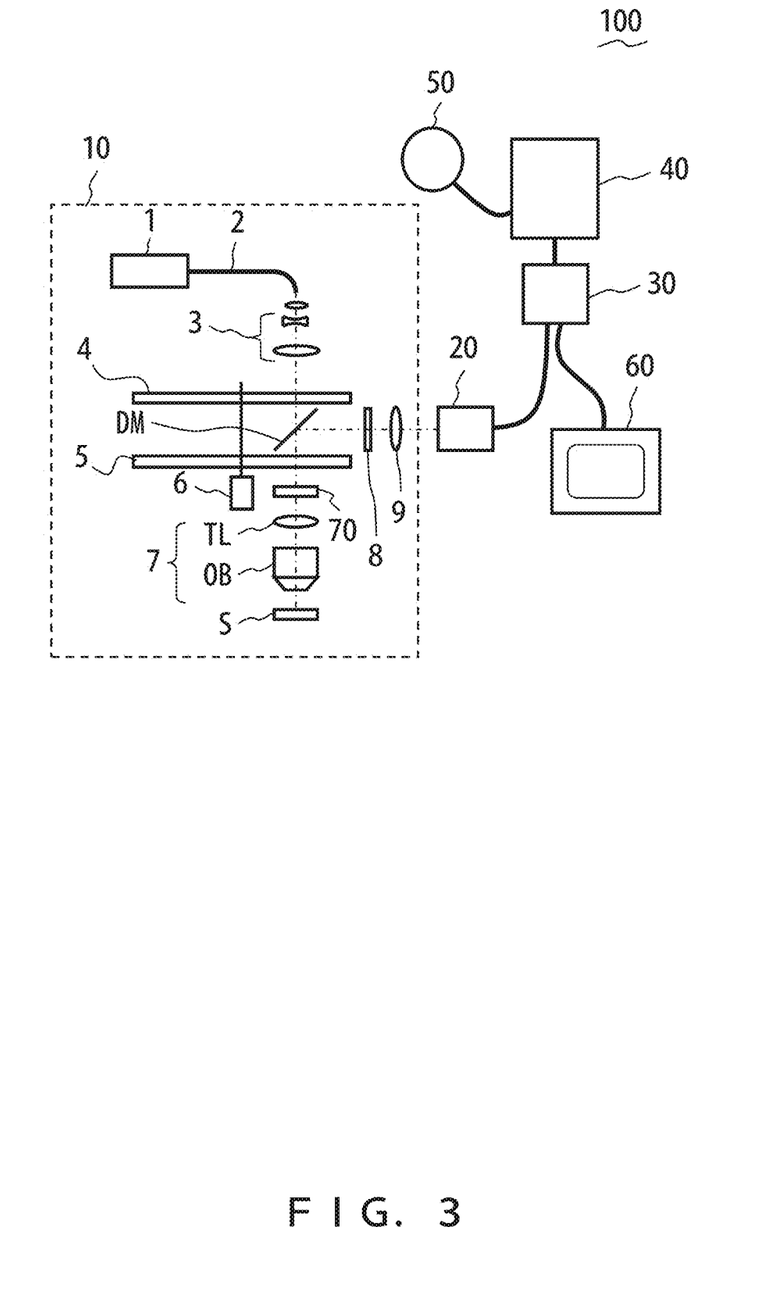
FIG. 3 is a diagram illustrating the structure of a fluorescence microscope system of the first embodiment.
Figure 4:
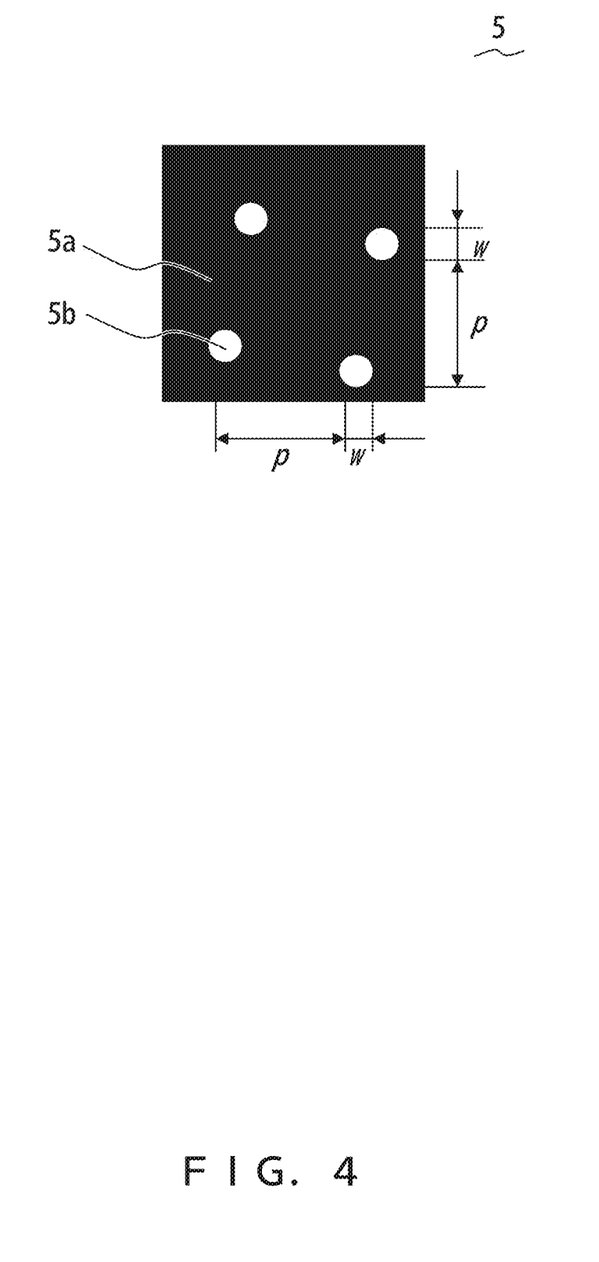
FIG. 4 is a diagram illustrating the structure of a rotation disc included in the fluorescence microscope system illustrated in FIG. 3.

FIG. 3 is a diagram illustrating the structure of a fluorescence microscope system of the present embodiment. FIG. 4 is a diagram illustrating the structure of a rotation disc included in the fluorescence microscope system illustrated in FIG. 3.

A fluorescence microscope system 100 illustrated in FIG. 3 is an image generation system configured to generate a super-resolution image of a sample. The fluorescence microscope system 100 is provided with a fluorescence microscope main body 10 that forms an optical image of a sample S on a CCD camera 20 and the CCD camera 20 of a light detector configured to detect light from the sample S. The fluorescence microscope system 100 is further provided with a computer 30 and an image processing board 40 that execute image-processing operations for an image of the sample generated in accordance with an output from the CCD camera 20, a recording medium 50 configured to record the image of the sample S, and a monitor 60 configured to display the image of the sample S.

The fluorescence microscope main body 10 is provided with a optical fiber light source including a laser 1 and a single mode optical fiber 2 to emit laser light for the illumination light, and a beam expander 3 configured to change a beam diameter of the laser light emitted from the fiber light source. The fluorescence microscope main body 10 is further provided with a dichroic mirror DM configured to transmit the laser light and to reflect fluorescence from the sample to which the laser light is emitted, a microlens array 4 and a rotation disc 5 that are placed across the dichroic mirror DM, and a motor 6 that rotates the microlens array 4 and the rotation disc 5.

The dichroic mirror DM is an optical path branching device configured to form optically branching paths for the laser light and the fluorescence from the sample. The microlens array 4 is closer to the laser 1 than the dichroic mirror DM is while the rotation disc 5 is closer to the sample S than the dichroic mirror DM is. The rotation disc 5 is a modulator with a periodic modulation pattern in which light-transmissive regions are periodically formed to modulate an intensity distribution of the laser light on the sample S. The rotation disc 5 is also a scanner that rotates to scan the sample S and that is placed at a position conjugate to a focal plane of the objective OB.

The fluorescence microscope main body 10 includes, in the illumination optical path defined between the dichroic mirror DM and the sample S, an imaging optical system 7 that forms an intermediate image of the sample S on the rotation disc 5. The imaging optical system 7 is provided with the objective OB and a tube lens TL. The fluorescence microscope main body 10 further includes, in the detection optical path disposed between the dichroic mirror DM and the CCD camera 20, a barrier filter 8 configured to cut off the laser light and a photographing lens 9 configured to project the intermediate image formed on the rotation disc 5. The fluorescence microscope main body 10 still further includes a ¼-wavelength plate 70 that is placed in the illumination optical path between the objective OB and the dichroic mirror DM to convert the linearly polarized laser light into the circularly polarized laser light.

As illustrated in FIG. 4, the rotation disc 5 includes a light shielding portion 5a for shielding light and a plurality of apertures 5b for transmitting light. A plurality of the apertures 5b have respective pinholes with aperture diameters w and are aligned at aperture periods p in both longitudinal and lateral directions. The rotation disc 5 is a so-called Nipkow disc that has pinhole-like apertures 5b. A focus position of each microlens array 4 is set to be consistent with the pinhole-like aperture formed on the rotation disc 5. The microlens array 4 and the rotation disc 5 are rotated by the motor 6. The motor 6 rotates the microlens array 4 and the rotation disc 5 such that their relative position remains unchanged. With this, since most of the laser light emitted from the laser 1 passes through the apertures 5b, the laser light can be efficiently irradiated onto the sample S.

In the fluorescence microscope main body 10, the rotation disc 5 rotates to modulate a spatial intensity distribution of the laser light and a spatial intensity distribution of the fluorescence at an intermediate image position of the sample S, and the following phenomena occur.

First, the rotation disc 5 modulates the spatial intensity distribution of the laser light emitted from the sample S so that the part of high-frequency components that exceeds a cut-off frequency fc of the objective OB in frequency components of the fluorescence produced at the sample S is shifted to a frequency that is equal to or less than the cut-off frequency fc and the shifted high-frequency components are transmitted to the intermediate image position through the imaging optical system 7. Further, the rotation disc 5 demodulates the spatial intensity distribution of the fluorescence (intermediate image) from the sample S so that shifted frequency components that are equal to or lower than the cut-off frequency fc are restored to the original high-frequency components and the restored high-frequency components are then transmitted to the photographing surface of the CCD camera through the photographing lens 9.

That is, the fluorescence microscope main body 10 in the fluorescence microscope system 100 functions as a super-resolution image component transmitter configured to transmit the fluorescence including frequency components (super-resolution image components) that exceed the cut-off frequency fc of the objective OB to the CCD camera 20. Together with this, the fluorescence microscope main body 10 also carries out demodulation processing automatically while such processing is being done by image processing in a structured illumination method (SIM) that is an ordinary super-resolution image technology.

In addition, in the fluorescence microscope main body 10, since the ¼-wavelength plate 70 is provided between the objective OB and the dichroic mirror DM, laser light that is not linearly polarized but is circularly polarized is incident on the objective OB. A polarized directional distribution of the light flux in the circularly polarized laser light (illumination light) is symmetric with respect to the optical axis of the laser light (the optical axis of the objective). Hence, a spot of the laser light formed on the sample S is symmetrical in shape with respect to the optical axis and the PSF of the optical system is also symmetric with respect to the optical axis.

The CCD camera 20 receives the fluorescence including the super-resolution image components transmitted through the fluorescence microscope main body 10 and outputs an image signal of the sample S including the super-resolution image components to the computer 30. As described above, since the spot shape of the laser light formed on the sample S is symmetric with respect to the optical axis in the fluorescence microscope main body 10, the image signal output to the computer 30 has a resolution capability without directional dependence. The computer 30 and an image processing board 40 are an image generator configured to generate an image of the sample S (hereinafter referred to as the original image) in accordance with the output signal (image signal) from the CCD camera 20 as well as an image processor configured to enhance the super-resolution image component of the original signal. In general, since the super-resolution image component that exceeds the cut-off frequency of the objective OB is faint, only a component with a weak contrast can be transmitted. In the fluorescence microscope system 100, the computer 30 and the image processing board 40 enhance relatively strongly the super-resolution image component in comparison with frequency components that are equal to or less than its frequency, so that a super-resolution image in which the super-resolution image component is suitably visualized can be obtained. The processing operation for enhancing the super-resolution image component is a digital filtering processing operation, for example. The super-resolution image component of the sample S processed by the computer 30 and the image processing board 40 is stored when necessary and is displayed on the monitor 60.

As described above, the fluorescence microscope 100 can generate a super-resolution image with a non-directionally dependent resolution and with the super-resolution image component enhanced.

When the super-resolution image is generated by using an ordinary structured illumination method (SIM), a plurality of original images are obtained by changing directions with reference to modulation patterns. In contrast to this, the fluorescence microscope system 100 is not required to obtain a plurality of original images but it is sufficient to obtain one original image. In addition, an ordinary structured illumination method (SIM) carries out image processing for demodulation processing but the fluorescence microscope main body 10 of the fluorescence microscope system 100 carries out such demodulation processing optically. With this, the fluorescence microscope system 100 can generate a super-resolution image at a high speed in comparison with an ordinary structured illumination method.

Further, the filter processing operation to enhance the super-resolution image component executed by the computer 30 and the image processing board 40 is ordinarily carried out by a filter designed on the assumption that the PSF is symmetric with respect to the optical axis. In the fluorescence microscope system 100, the laser light converted into the circularly polarized light by the ¼-wavelength plate 70 is incident on the objective OB, and the PSF becomes symmetric with respect to the optical axis. Hence, according to the fluorescence microscope system 100, the super-resolution image component can be enhanced more optimally than can a super-resolution image component conventionally.

Note that it is acceptable to provide the fluorescence microscope system 100 with a light polarization converter configured to convert a polarization condition of the laser light to make a polarization direction distribution in the light flux of the laser light symmetric with respect to the optical axis. Thus, the light polarization converter is not only limited to the ¼-wavelength plate 70 configured to convert the linearly polarized light into the circularly polarized light but also can be a light polarization converter configured to convert the linearly polarized light into radially polarized light. Additionally, note here that the symmetry with respect to the optical axis means a rotational symmetry, the order of which is more than 2. In other words, it does not include such a rotational symmetry of order 2 as linearly polarized light or elliptically polarized light. A rotational symmetries of orders of a multiple of 4 (for example, order 4 or order 8) are particularly preferable. A converter for converting into the radially polarized light can be a plurality of wavelength plates (½ wavelength plates), for example, placed in directions of the optic axis different from each other. If symmetric regions with respect to the optical axis of the light flux in the laser light are incident on the wavelength plates with different optic axes, a polarization direction of each region rotates by a different angle. With this, a polarization state of the laser light can be converted into a polarization state in which a distribution of the polarization direction is symmetric with respect to the optical axis. Further, since the light polarization converter is acceptable if a polarization direction can be changed, a liquid crystal element can be used in place of the wavelength plate.

In addition, although the ¼-wavelength plate 70 that is the light polarization converter is placed between the dichroic mirror DM and the objective OB in the system 100, as long as the illumination light (laser light) is incident on the objective OB with a state in which a polarization direction distribution of the light flux in the laser light is symmetric with respect to the axis of the illumination light, the light polarization converter can be placed at any position. Hence, the light polarization converter is not placed in the optical path between the dichroic mirror DM and the objective OB which are effectuated on both the laser light and the fluorescence, but can be placed in the optical path effectuated only on the laser light between the laser 1 and the dichroic mirror DM. The light polarization converter can also be placed in a fluorescence cube including the dichroic mirror DM.

When the light polarization converter is placed between the dichroic mirror DM and the objective OB, the laser light incident on the dichroic mirror is linearly polarized light with a particular direction. Thus, the dichroic mirror DM may be simply designed to match the linearly polarized light with the particular polarization direction. It provides an advantage in facilitating the exercise of performance of the dichroic mirror. On the other hand, if the light polarization converter is placed between the laser 1 and the dichroic mirror DM, the light polarization converter does not effectuate the fluorescence. Thus, the decline in detection efficiency of the fluorescence due to its passage through the light polarization converter can be prevented.

A combination of the microlens array and the Nipkow disc is exemplified in FIGS. 3 and 4 but the rotation disc (Nipkow disc) 5, for example, can be replaced with a rotation disc having a structure of lines and spaces. In this case, a replacement for the microlens array 4 preferably includes cylindrical lenses having focus positions that are placed so as to be consistent with line-like apertures formed on the rotation disc. The modulator configured to modulate an intensity distribution of the laser light on the sample S can be merely provided with a periodical pattern in which light-transmissive regions are periodically formed.

Second Embodiment

Figure 5:
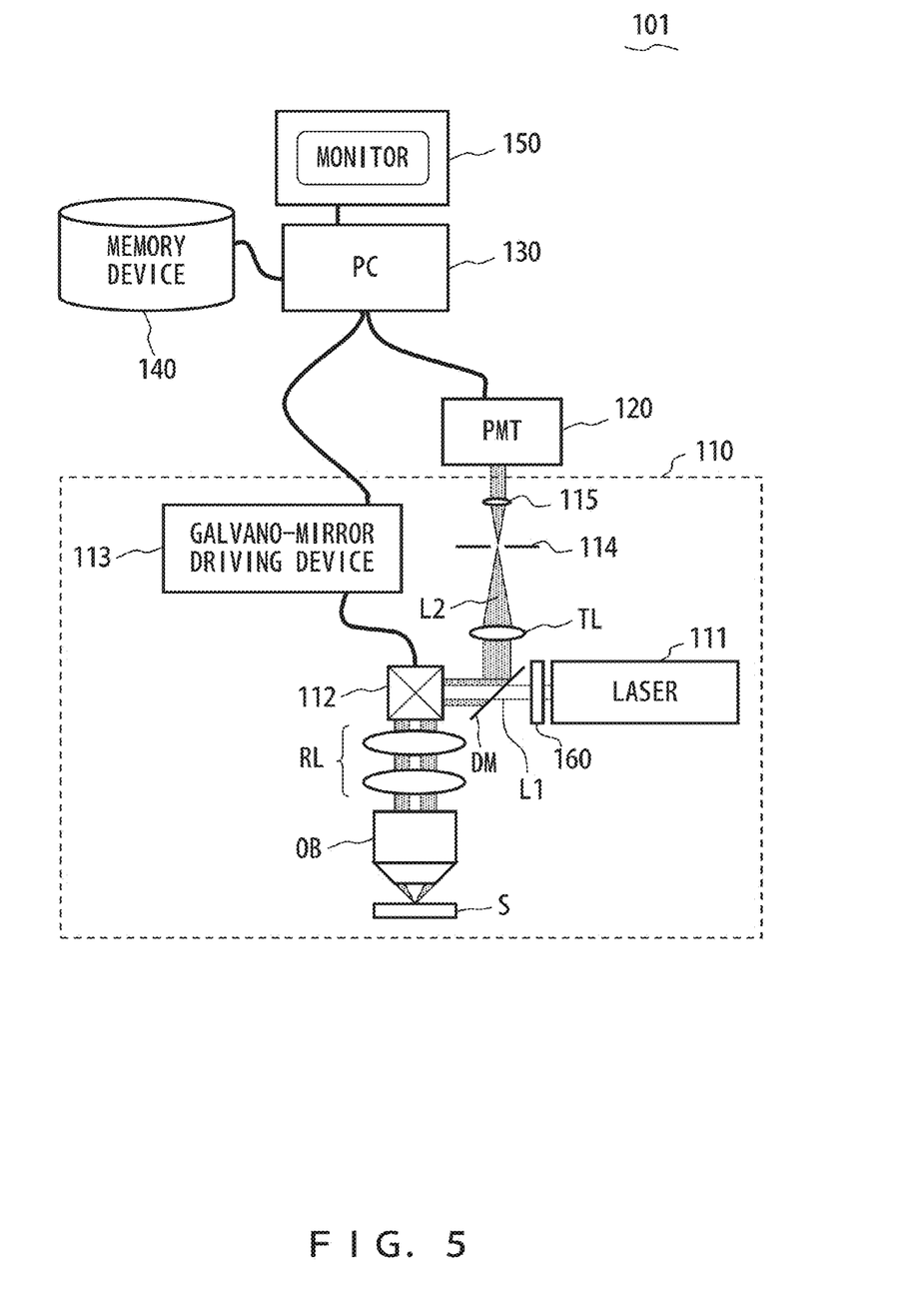
FIG. 5 is a diagram illustrating the structure of a fluorescence microscope system of the second embodiment.

FIG. 5 is a diagram illustrating a fluorescence microscope system of this embodiment. The fluorescence microscope system 101 is an image generating system configured to generate a super-resolution image of a sample similarly to the fluorescence microscope system 100 of the first embodiment.

The fluorescence microscope system 101 is provided with a fluorescence microscope main body 110 of a confocal microscope that is a kind of laser scanning type microscope, and a photomultiplier tube (hereinafter called the PMT) 120 that is a light detector configured to detect light from the sample S. The fluorescence microscope system 101 is further provided with a PC 130 configured to process an image of a sample S generated in accordance with an output signal from the PMT 120, a memory device 140 configured to store the image of the sample S, and a monitor 150 configured to display the image of the sample S.

The fluorescence microscope main body 110 is provided with a laser 111 configured to emit laser light L1, a ¼-wavelength plate 160 placed in an illumination light path to convert the laser light of a linearly polarized light to that of circularly polarized light, and a dichroic mirror DM configured to transmit the laser light L1 and to reflect the fluorescence L2. The fluorescence microscope main body 110 is provided with a galvano-mirror 112 configured to scan the sample S, a galvano-mirror driving device 113 configured to drive the galvano-mirror 112 in accordance with a modulation control signal, a relay optical system RL configured to relay a pupil of an objective OB to the galvano-mirror 112, and an objective OB configured to condense the light on the sample S. The galvano-mirror 112 is placed at a position conjugate to the pupil of the objective OB.

The ¼-wavelength plate 160 is placed in an optical path of the laser light L1 that is illumination light to illuminate the sample S and is a light polarization converter configured to convert a polarization state of the laser light L1 to make a polarization direction distribution in a light flux of the laser light L1 symmetric with respect to the optical axis of the laser light L1 (the optical axis of the objective). The dichroic mirror DM is an optical path branching device configured to form optically branching paths for the laser light L1 and the fluorescence L2 from the sample S. A position for condensing the laser light L1 moves on an X-Y plane orthogonal to the optical axis since the galvano-mirror driving device 113 drives the galvano-mirror 112 in accordance with a modulation control signal from the PC 130. That is, the galvano-mirror 112 is a modulator configured to modulate an intensity distribution of the laser light L1 on the sample S by moving the light condensing position, as well as a scanner configured to scan the sample S.

The fluorescence microscope main body 110 is further provided with a tube lens TL, a confocal diaphragm 114, and a lens 115 on a reflection optical path of the dichroic mirror DM (namely, a detection optical path between the dichroic mirror DM and the PMT 120). In the confocal diaphragm 114, a pinhole (aperture) is formed at a position optically conjugating with the light condensing position (that is, the focal position of the objective OB) of the laser light L1 through the objective OB.

In the fluorescence microscope main body 110, the laser light L1 emitted from the laser 111 is converted into circularly polarized light by the ¼-wavelength plate 160, then passes through the dichroic mirror DM and is incident on the objective OB via the galvano-mirror 112 and the relay optical system RL. The objective OB condenses the circularly polarized laser light L1 on the sample, and the laser light L1 is irradiated to the sample S. At this time, a spot of the laser light is symmetric in shape with respect to the optical axis of the objective OB. In the sample S irradiated by the laser light L1, a fluorescent substance existing in the light condensing position is excited so as to emit fluorescence L2 with an amount of light linearly dependent on an irradiation intensity of the laser light L1. The fluorescence L2 proceeds in the opposite direction of the same path of the laser light L1 and is incident on the dichroic mirror DM. The fluorescence L2 reflected from the dichroic mirror DM is condensed through the tube lens TL and is then incident on the confocal diaphragm 114. At the confocal diaphragm 114, fluorescence arising from other than the light condensing position is cut off but the fluorescence L2 arising from the light condensing position passes through the aperture. The fluorescence L2 is then incident on, and is detected by, the PMT 120 though the lens 15.

Under the conditions of a given, a confocal microscope can detect a super-resolution image component that exceeds a cut-off frequency of an objective by a confocal effect. The fluorescence microscope system 101 of this embodiment makes use of this phenomenon to generate a super-resolution image, and is a super-resolution image component transmitter configured to transmit the light from a sample including a super resolution image component that is frequency components that exceed the cut-off frequency of the objective OB to the PMT 120.

The PMT 120 generates a detection signal in accordance with an amount of light of the fluorescence L2 including the super-resolution image component transmitted by the fluorescence microscope 110 and outputs the same to a PC 130. The PC 130 generates a scanned image of the sample S in accordance with the modulation control signal output by the PC 130 to the galvano-mirror driving device 113 and the detection signal from the PMT 120. Note that, as described above, since the spot of the laser light formed on the sample S is symmetric with respect to the optical axis, the scanned image generated by the PC 130 has a resolution capability that is not dependent on any direction. The PC 130 further enhances relatively the super-resolution image component of the scanned image of the sample S in comparison with frequency components that are equal to or lower than the super-resolution image component, thereby generating the super-resolution image with the super-resolution image component well visualized. That is, the PC 130 is an image generator configured to generate a scanned image of the sample S generated in accordance with the output of the PMT 120 as well as an image processor configured to enhance the super-resolution image component of the scanned image. The enhancement processing operation executed by the PC 130 is a digital filter processing operation, for example. The super-resolution image processed by the PC 130 is stored in the memory device 140 when necessary and is displayed on the monitor 150.

Figure 6:
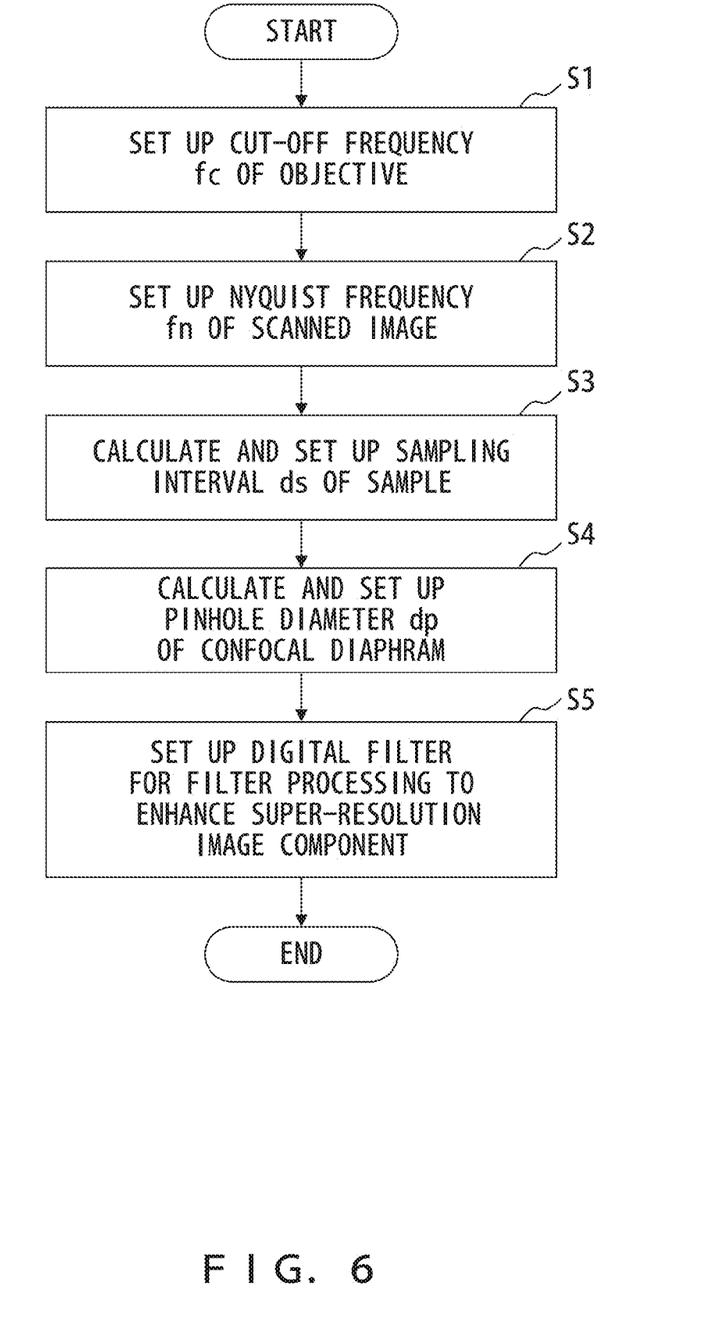
FIG. 6 is a flow chart illustrating a pre-processing operation executed before the acquisition of a scanned image by the fluorescence microscope system of the second embodiment.

FIG. 6 exemplifies a pre-processing operation executed prior to the acquisition of the scanned image by the fluorescence microscope system 101. The fluorescence microscope system 101 executes the pre-processing operation illustrated in FIG. 6 to generate the super-resolution image. The pre-processing operation will be described hereinbelow with reference to FIG. 6.

First, in step S1, a cut-off frequency fc of the objective OB is calculated from a wavelength $\lambda$ of laser light used for observation and a numerical aperture NA and is set up. The cut-off frequency fc of the objective OB is calculated by the following formula: fc=(2×NA)/$\lambda$.

In step S2, a Nyquist frequency fn of a scanned image is set up. In order to store a super-resolution image component, the Nyquist frequency fn is set up to be a value larger than the cut-off frequency fc calculated in step S1. It is desirable to set up the Nyquist frequency fn of the scanned image to a high value to properly detect the super-resolution image component. On the other hand, if the Nyquist frequency fn of the scanned image is excessively high, it becomes a factor in the reduction in the amount of the detection light or the increase in noise. Thus, it is preferable to set up a Nyquist frequency fn of the scanned image that is equal to or greater than about 1.5 times, but is equal to or less than about 4 times, the cut-off frequency fc.

In step S3, a sampling interval ds of the sample S is calculated in accordance with the Nyquist frequency fn set up in step S2 and is set up. In order for the Nyquist frequency fn to be half of the sampling frequency, the sampling interval ds is calculated by the formula ds=0.5/fn. Further, the PC 130 generates the modulation control signal and outputs the same to the galvano-mirror driving device so that the scanning of the sample S is carried out at the acquisition of the scanned image to realize the sampling period ds set up in step S3.

In step 4, a pinhole diameter dp of the confocal diaphragm 114 is calculated from an airy disc diameter da of the fluorescence in the sample S, a magnification Mob of the objective in the case when the objective is used with the tube lens TL and the relay optical system RL, and an adjustment coefficient α. The airy disc diameter da is calculated by the formula da=(1.22×λem)/NA where λem is a fluorescence wavelength. The pinhole diameter dp is calculated by the formula dp=α×da×Mob. By setting up the adjustment coefficient α to be smaller than 1, the pinhole diameter can be smaller than the airy disc diameter (da×Mob) of the fluorescence in the confocal diaphragm 114. Thus, it is desirable for the adjustment coefficient α to be smaller than 1. In view of the fact that an amount of the detection light decreases in the case where the adjustment coefficient α is made to be excessively small and that the super-resolution image component becomes less in the case where the adjustment coefficient α is made to be excessively large, the adjustment coefficient α is set up. The adjustment coefficient α is 0.5, for example.

Lastly, in step S5, the digital filter for the filter processing to enhance a super-resolution image component exceeding the cut-off frequency is set up, and the pre-processing operation is completed. The digital filter set up at this time is designed on the assumption that the PSF is symmetric with respect to the optical axis.

By the execution of the pre-processing operation, the pinhole diameter of the confocal diaphragm 114 is set to be small against the airy disc diameter. At the acquisition of the scanned image, the modulation control signal that makes the Nyquist frequency of the scanned image larger than the cut-off frequency of the objective is output to the galvano-mirror driving device 113. Hence, in the fluorescence microscope system 101, the fluorescence including the super-resolution image component is transmitted to the PMT 120 by the fluorescence microscope main body 110, and the scanned image including the super-resolution image component is generated in accordance with the output signal of the PMT 120 and the modulation control signal generated by the PC 130. In addition, since the super-resolution image component in the scanned image is enhanced by the filter processing, the super-resolution image component is visualized.

As described so far, the fluorescence microscope system 101 of the present embodiment can generate a super-resolution image with an enhanced super-resolution image component that has a resolution with no dependence on direction, similarly to the fluorescence microscope system 100 of the first embodiment. Further, since the PSF of the optical system is symmetric with respect to the optical axis, the super-resolution image component can be enhanced more optimally by the filter processing than a conventional system, also similarly to the fluorescence microscope system 100 of the first embodiment.

The filter processing to enhance the super-resolution image component is optimized by designing a filter according to the PSF of the optical system. Thus, when the filter processing is optimized for the PSF to be asymmetric with respect to the optical axis, it is necessary to design each filter for each direction of an image. This is because the PSF rotates relatively to the image and becomes a different PSF in the case where the image is rotated by changing a raster scanning direction of the galvano-mirror 112, for example. In the fluorescence microscope system 101, however, since the laser light converted into a circularly polarized light by the ¼-wavelength plate 160 is incident on the objective OB, the spot of the laser light formed on the sample S becomes symmetric in shape with respect to the optical axis and the PSF of the optical system is also symmetric with respect to the optical axis. Hence, it is not necessary to design a filter for each direction of the image so that the filter processing optimized by a single filter can be performed, regardless of a direction of the image.

Note that the fluorescence microscope system 101 is similar to the fluorescence microscope system 100 of the first embodiment from points of view such as that it is proper to simply include the light polarization converter configured to convert a polarization condition of the laser light to make a polarization direction distribution in the light flux of the laser light symmetric with respect to the optical axis; the light polarization converter is not limited to the wavelength plate; and the light polarization converter is desirably placed either at the position to effectuate only the laser light or at the position to effectuate both the laser light and the fluorescence.

Third Embodiment

Figure 7:
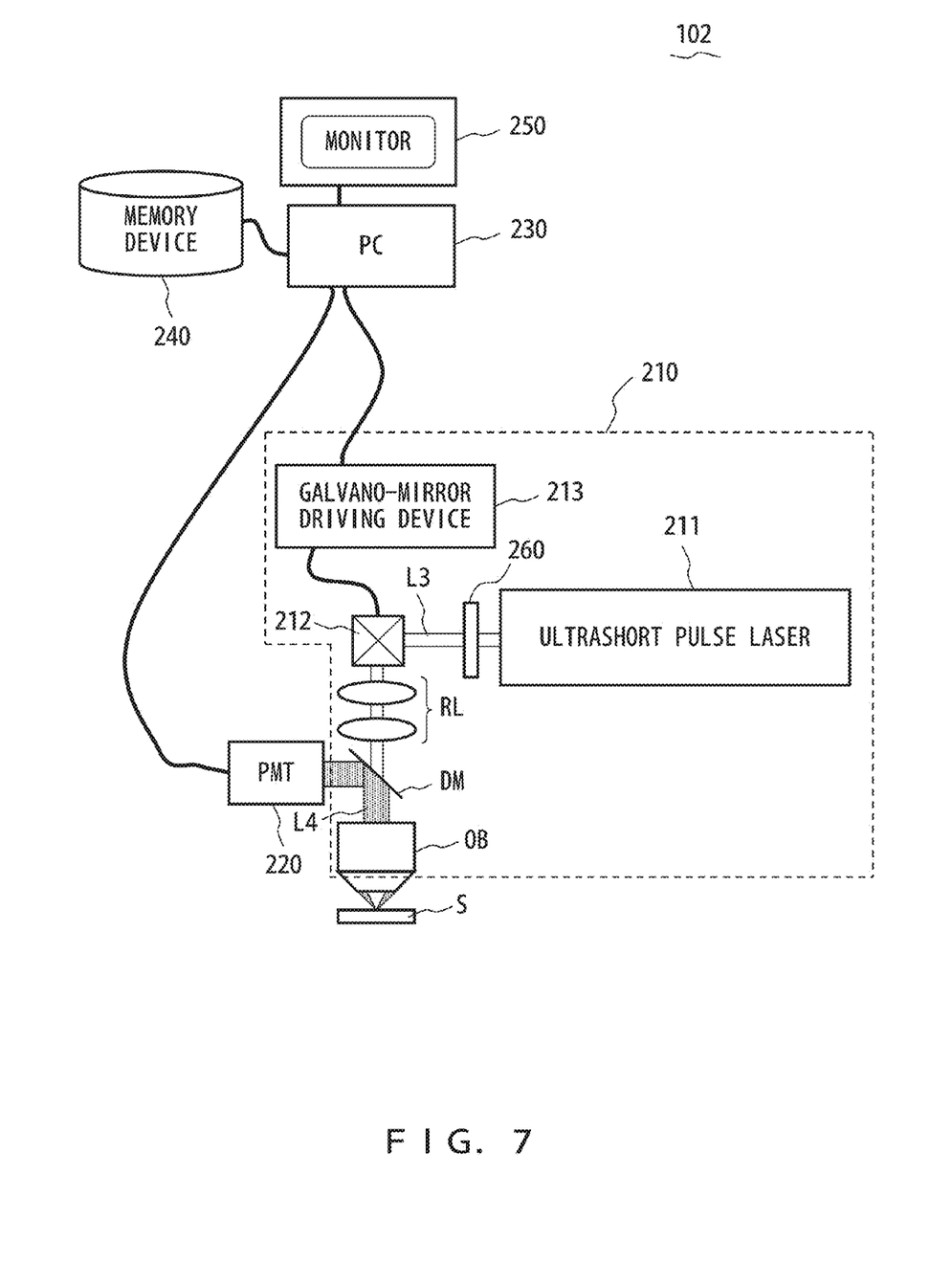
FIG. 7 is a diagram illustrating the structure of a fluorescence microscope system of the third embodiment.

FIG. 7 is a diagram to illustrate the structure of a fluorescence microscope system of this embodiment. The fluorescence microscope system 102 is an image generation system to generate a super-resolution image of a sample, similarly to the fluorescence microscope system 100 of the first embodiment.

The fluorescence microscope system 102 is provided with a fluorescence microscope main body 210 that is a two-photon excitation microscope, which is a kind of non-linear optical microscope, and a PMT 220 that is a light detector configured to detect light from the sample S. The fluorescence microscope system 102 is further provided with a PC 230 configured to execute an image processing operation for an image of the sample S generated in accordance with an output signal of the PMT 220, a memory device 240 configured to store the image of the sample S, and a monitor 250 configured to display the image of the sample S.

The fluorescence microscope main body 210 is provided with an ultrashort pulse laser 211 configured to emit laser light L3 that is an ultrashort pulse laser light, a ¼-wavelength plate 260 configured to convert the laser light L3 that is linearly polarized light to circularly polarized light, and a dichroic mirror DM that the laser light L3 passes through and which reflects fluorescence L4 from the sample S. The fluorescence microscope main body 210 is further provided with a galvano-mirror 212 configured to scan the sample S, a galvano-mirror driving device 213 configured to drive the galvano-mirror 212 in accordance with a modulation control signal, the objective OB configured to condense the laser light L3 on the sample S, and a relay optical system RL configured to relay the pupil of the objective OB to the galvano-mirror 212.

The ¼-wavelength plate 260 is placed in an optical path of the laser light L3 that is illumination light to be irradiated to the sample S and a light polarization converter configured to convert a polarization state of the laser light L3 to make a polarization direction distribution in the light flux of the laser light L3 symmetric with respect to the optical axis of the laser light L3 (optical axis of the objective OB). The dichroic mirror DM is an optical path branching device configured to form optically branching paths for the optical path of the laser light L3 and the optical path of the fluorescence L4 from the sample S. Alight condensing position of the laser light L3 moves on an X-Y plane orthogonal to the optical axis with the driving of the galvano-mirror 212 by the galvano-driving device 213 in accordance the modulation control signal from the PC 230. That is, the galvano-mirror 212 is a modulator configured to modulate an intensity distribution of the laser light L3 on the sample S by changing the light condensing position as well as a scanner configured to scan the sample S.

The fluorescence microscope main body 210 differs from the fluorescence microscope main body 110 illustrated in FIG. 5, in that the fluorescence microscope main body 210 can produce a confocal effect by two-photon excitation. Thus, although the structure for guiding the fluorescence (two-photon-excited fluorescence) L4 to the PMT 220 is different from the fluorescence microscope main body 110, the fluorescence microscope main body 210, which is a two-photon excitation microscope, can also detect the super-resolution component exceeding the cut-off frequency of the objective by the confocal effect, similarly to the fluorescence microscope 110. The fluorescence microscope system 102 of this embodiment generates the super-resolution image by making use of this phenomenon and is a super-resolution image component transmitter configured to transmit the light from the sample including a super-resolution image component, namely a frequency component exceeding the cut-off frequency of the objective.

The PMT 220 generates the detection signal in response to an amount of the fluorescence including the super-resolution image component transmitted by the fluorescence microscope main body 210 and transmits the same to the PC 230. The PC 230 generates the scanned image of the sample S in accordance with the modulation control signal that the PC 230 outputs to the galvano-mirror driving device 213 and the detection signal from the PMT 220. Note that the spot of the laser light formed on the sample S is symmetric in shape with respect to the optical axis in the fluorescence microscope main body 210 so that the scanned image of the sample S generated by the PC 230 has a non-directionally dependent resolution capability. The PC 230 further generates a super-resolution image with a super-resolution image component well visualized by relatively enhancing the super-resolution image component of the sample S in comparison with frequency components that are equal to or lower than the super-resolution image component. That is, the PC 230 is an image generator configured to generate the scanned image of the sample S in accordance with the output signal from the PMT 230 as well as an image processor configured to enhance the super-resolution component of the scanned image. The image processing carried out by the PC 230 for enhancing the super-resolution component of the scanned image is digital filter processing, for example. The super-resolution component of the scanned image S processed by the PC 230 is stored in the memory device when necessary and is displayed on the monitor 240.

Also in the fluorescence microscope system 102, the pre-processing operation for generating the super-resolution image is executed prior to the acquisition of the scanned image, similarly to the fluorescence microscope system 101 of the second embodiment. The pre-processing operation executed by the fluorescence microscope system 102 is the same as the pre-processing operation illustrated in FIG. 6, except for the omission of step S4. By the execution of the pre-processing operation, a modulation control signal such that the Nyquist frequency of the scanned image becomes larger than the cut-off frequency of the objective is output to the galvano-mirror driving device 213. Thus, the fluorescence microscope main body 210 transmits the fluorescence including the super-resolution image component to the PMT 220 and the scanned image including the super-resolution image component is generated in accordance with the output signal from the PMT 220 and the modulation control signal generated by the PC 230 in the fluorescence microscope system 102. Further, since the super-resolution image component of the scanned image is enhanced by the filter processing of the PC 230, the super-resolution image component is visualized.

As described so far, similar to the fluorescence microscope systems of the first and second embodiments, the fluorescence microscope system 102 can generate the super-resolution image with the non-directionally dependent resolution and with the super-resolution image component enhanced. Also similarly to the fluorescence microscope systems of the first and second embodiments, since the PSF of the optical system is symmetric with respect to the optical axis, the super-resolution image component can be enhanced by the filter processing more optimally than by conventional filter processing.

Note that the fluorescence microscope system 102 is similar to the fluorescence microscope system 100 of the first embodiment and the fluorescence microscope system 101 of the second embodiment from such points of view as that it is proper to simply include the light polarization converter configured to convert a polarization condition of the laser light to make a polarization direction distribution in the light flux of the laser light symmetric with respect to the optical axis of the laser light; the light polarization converter is not limited to the wavelength plate; and the light polarization converter is desirably placed either at the position to effectuate only the laser light or at the position to effectuate both the laser light and the fluorescence. Similarly to the fluorescence microscope system 101 of the second embodiment, since the PSF of the optical system is also symmetric with respect to the optical axis, it is not necessary to design a filter for each direction of the image so that the filter processing optimized by a single filter can be executed, regardless of a direction of the image.

Fourth Embodiment

Figure 8:
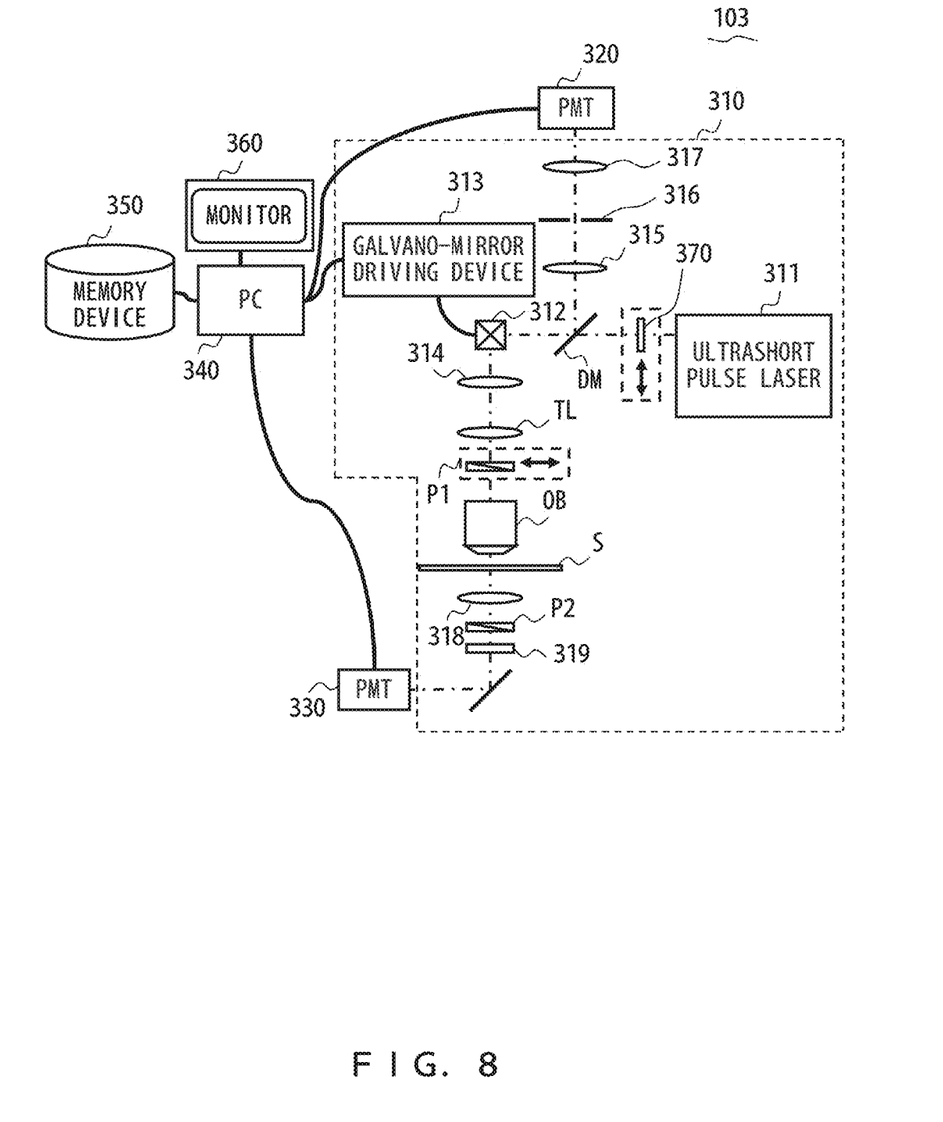
FIG. 8 is a diagram illustrating the structure of a fluorescence microscope system of the fourth embodiment.

FIG. 8 is a diagram to illustrate the structure of a fluorescence microscope system of this embodiment. The fluorescence microscope system 103 is an image generation system configured to generate a super-resolution image of a sample, similarly to the fluorescence microscope system 100 of the first embodiment.

The fluorescence microscope system 103 is provided with a microscope main body 310 that has the structure of a fluorescence microscope and the structure of a differential interference microscope, a PMT 320 that is a light detector configured to detect fluorescence from the sample S and a PMT 330 of a light detector configured to detect light passed through the sample S. The fluorescence microscope system 103 is further provided with a PC 340 configured to execute an image processing operation for an image of the sample S generated in accordance with an output signal of the PMT 320 or the PMT 330, a memory device 350 configured to store the image of the sample S, and a monitor 360 configured to display the image of the sample S.

The microscope main body 310 mainly differs from the fluorescence microscope main body 110 of the fluorescence microscope system 101 of the second embodiment in that it is provided with an optical element configured to acquire a differential interference image and with a ¼-wavelength plate 370 that is a light polarization converter and that is placed in a manner detachable from the optical path of the illumination light (laser light) to illuminate the sample S. The microscope main body 310 will be described hereinbelow with a focus on the differences with the fluorescence microscope main body 110.

The microscope main body 310 is provided with a DIC prism P1 that is a differential interference element on an illumination light path as an optical element for the acquisition of the differential interference image, a DIC prism P2 that is a differential interference element on a detection light path, and a polarization plate 319 that is a polarization element functioning as an analyzer. The DIC prism P2 is fixed in the optical path while the DIC prism P1 is placed in a removable manner with respect to the optical path in order to remove the prism P1 from the optical path in the case when the fluorescence is observed. Further, the polarizer plate 319 is disposed in a crossed-Nichol state direction with respect to a polarization direction of the laser light.

The microscope main body 310 is provided with a galvano-mirror 312 placed at a position conjugate to an objective OB. A pupil relay optical system consisting of an tube lens TL and a pupil projection lens 314 is provided between the galvano-mirror 312 and the objective OB to project the pupil of the objective OB onto the galvano-mirror 312.

In order to acquire the fluorescence image in the microscope system 103 structured as described above, the ¼-wavelength plate 370 is inserted between the laser 311 and the dichroic mirror DM in the illumination light path and the DIC prism P1 is removed from the illumination light path. Further, the pre-processing operation illustrated in FIG. 6 as described in the second embodiment is executed and then the sample S is scanned, so that the super-resolution image with a non-directionally dependent resolution and with the super-resolution image component enhanced can be generated, similarly to the fluorescence microscope systems of the first embodiment through the third embodiment. Since the PSF of the optical system is symmetrical with respect to the optical axis, the super-resolution component can be enhanced more optimally than a conventional system, also similarly to the fluorescence microscope systems of the first embodiment through the third embodiment.

Further, in the microscope system 103, when the differential interference image is acquired, the ¼-wavelength plate 370 is removed from the illumination light path to make linearly polarized light incident on the DIC prism P1, and the DIC prism P1 is inserted from the illumination light path. By scanning the sample S, the microscope system 103 then can generate the differential interference image in accordance with an output signal from the PMT 330 and a modulation control signal output to the galvano-mirror driving device 313.

The fluorescence microscope system 103 is similar to the fluorescence microscope systems of the first embodiment through the third embodiment from such points of view as that it is proper for the fluorescence microscope system. 103 simply provided with the light polarization converter configured to convert a polarization condition of the laser light to make a polarization direction distribution in the light flux of the laser light symmetric with respect to the optical axis of the laser light; the light polarization converter is not limited to the wavelength plate; and the light polarization converter is desirably placed either at the position to effectuate only the laser light or at the position to effectuate both the laser light and the fluorescence. Similarly to the fluorescence microscope systems of the second embodiment and the third embodiment, since the PSF of the optical system is also symmetrical with respect to the optical axis at the fluorescence observation, it is not necessary to design a filter for each direction of the image so that the filter processing optimized by a single filter can be executed, regardless of a direction of the image.

Note that the fluorescence microscope system 103 can be used as a second harmonics generation (SHG) microscope. The SHG microscope has a directionality such that an intensity of generating light changes in a polarization state of illumination light, and a intensity of detected light changes in accordance with a polarization state of the illumination light in the case of linear polarization or circular polarization. In the fluorescence microscope system 103, an SHG observation can be carried out in state in which the illumination light is either linearly polarized or circularly polarized because the ¼-wavelength plate 370 is placed in a removable manner.

An image generation system of the present invention can be modified or changed within a scope of the claims set forth herein as long as its concept does not depart from them. The image generation system can be provided with a confocal microscope used in an image scanning microscopy (hereinafter referred to as the ISM), and can generate a super-resolution image via an effect similar to the case where the ISM is realized by making a pinhole diameter small. The present invention is applicable to various methods of generating a super-resolution image by making use of a laser light source generating linearly polarized light.

What is claimed is:

1. An image generation system comprising:
a light detector configured to detect light from a sample;
a super-resolution image component transmitter including an objective and being configured to transmit the light from the sample including a super-resolution image component to the light detector, the super-resolution image component being a frequency component exceeding a cut-off frequency of the objective; and
an image processor configured to enhance the super-resolution image component of an image of the sample generated in accordance with an output signal of the light detector,
wherein the super-resolution image component transmitter further includes:
a light polarization converter that is provided in an optical path of illumination light for illuminating the sample and that is configured to convert a polarization state of the illumination light to make a polarization direction distribution in a light flux of the illumination light symmetrical with respect to an optical axis of the illumination light; and
a modulator configured to modulate an intensity distribution of the illumination light on the sample, and
wherein the modulator is a rotation disc configured to scan the sample, the rotation disc being provided at a position conjugate to a focal plane of the objective, and the rotation disc including a light shielding portion for shielding light and a plurality of apertures for transmitting light.

2. The image generation system of claim 1, wherein the light polarization converter converts the illumination light into circularly polarized light.

3. The image generation system of claim 1, wherein the light polarization converter converts the illumination light into radially polarized light.

4. The image generation system of claim 1, wherein the super-resolution image component transmitter further includes:
a light source configured to emit the illumination light; and an optical path branching device configured to form optically branching paths for an optical path of the illumination light and an optical path of the light from the sample, wherein the light polarization converter is provided between the light source and the optical path branching device.

5. The image generation system of claim 1, wherein the super-resolution image component transmitter further includes:

an optical path branching device configured to form optically branching paths for an optical path of the illumination light and an optical path of the light from the sample, and wherein the light polarization converter is provided between the objective and the optical path branching device.

6. The image generation system of claim 1, wherein the light polarization converter is a ¼-wavelength plate.

7. The image generation system of claim 1, wherein the light polarization converter is a plurality of ½-wavelength plates provided such that directions of their optic axes are different from each other.

8. The image generation system of claim 1, wherein the light polarization converter is removably provided in the optical path of the illumination light manner.

9. The image generation system of claim 1, wherein the super-resolution image component transmitter is a non-linear optical microscope.

10. An image generation system comprising:

a light detector configured to detect light from a sample;

a super-resolution image component transmitter including an objective and being configured to transmit the light from the sample including a super-resolution image component to the light detector, the super-resolution image component being a frequency component exceeding a cut-off frequency of the objective; and an image processor configured to enhance the super-resolution image component of an image of the sample generated in accordance with an output signal of the light detector, wherein the super-resolution image component transmitter further includes:

a light polarization converter consisting of one element that is provided in an optical path of illumination light for illuminating the sample and that is configured to convert a polarization state of the illumination light to make a polarization direction distribution in a light flux of the illumination light symmetrical with respect to an optical axis of the illumination light;

a light source configured to emit the illumination light; and an optical path branching device configured to form optically branching paths for an optical path of the illumination light and an optical path of the light from the sample, and wherein the light polarization converter is provided between the light source and the optical path branching device.

11. The image generation system of claim 10, wherein the super-resolution image component transmitter further includes a modulator which is a scanner configured to scan the sample and is provided at a position conjugate to a focal plane of the objective.

12. The image generation system of claim 10, wherein the super-resolution image component transmitter is a confocal microscope including a confocal diaphragm with an aperture formed at a position conjugate to a focal plane of the objective.

13. The image generation system of claim 10, wherein the super-resolution image component transmitter is a non-linear optical microscope.

14. The image generation system of claim 11, wherein the scanner is a Nipkow disc that includes a light shielding portion for shielding light and a plurality of apertures for transmitting light.

15. An image generation system comprising:

a light detector configured to detect light from a sample;

a super-resolution image component transmitter including an objective and being configured to transmit the light from the sample including a super-resolution image component to the light detector, the super-resolution image component being a frequency component exceeding a cut-off frequency of the objective; and an image processor configured to enhance the super-resolution image component of an image of the sample generated in accordance with an output signal of the light detector, wherein the super-resolution image component transmitter further includes:

a light polarization converter that is provided in an optical path of illumination light for illuminating the sample and that is configured to convert a polarization state of the illumination light to make a polarization direction distribution in a light flux of the illumination light symmetrical with respect to an optical axis of the illumination light; and an optical path branching device configured to form optically branching paths for an optical path of the illumination light and an optical path of the light from the sample, and wherein the light polarization converter is provided between the objective and the optical path branching device.

16. The image generation system of claim 15, wherein the super-resolution image component transmitter further includes a modulator which is a scanner configured to scan the sample and is provided at a position conjugate to a focal plane of the objective.

17. The image generation system of claim 15, wherein the super-resolution image component transmitter is a confocal microscope including a confocal diaphragm with an aperture formed at a position conjugate to a focal plane of the objective.

18. The image generation system of claim 15, wherein the super-resolution image component transmitter is a non-linear optical microscope.

19. The image generation system of claim 16, wherein the scanner is a Nipkow disc that includes a light shielding portion for shielding light and a plurality of apertures for transmitting light.

20. The image generation system of claim 15, wherein the light polarization converter is a ¼-wavelength plate.

* * * * *